US012619962B2

(12) United States Patent
Strealy

(10) Patent No.: US 12,619,962 B2
(45) Date of Patent: May 5, 2026

(54) SYSTEMS AND METHODS TO GENERATE A DIGITAL ASSET ON A TEMPORARY WALLET AND TRANSFER THE DIGITAL ASSET TO A PERMANENT DIGITAL WALLET

(71) Applicant: Disney Enterprises, Inc., Burbank, CA (US)

(72) Inventor: Jokton Mishael Strealy, Valdosta, GA (US)

(73) Assignee: Disney Enterprises, Inc., Burbank, CA (US)

( * ) Notice: Subject to any disclaimer, the term of this patent is extended or adjusted under 35 U.S.C. 154(b) by 318 days.

(21) Appl. No.: 18/327,039

(22) Filed: May 31, 2023

(65) Prior Publication Data

US 2024/0020661 A1 Jan. 18, 2024

Related U.S. Application Data

(60) Provisional application No. 63/388,563, filed on Jul. 12, 2022.

(51) Int. Cl.
G06Q 20/10 (2012.01)
G06Q 20/36 (2012.01)
G06Q 20/38 (2012.01)

(52) U.S. Cl.
CPC ......... G06Q 20/10 (2013.01); G06Q 20/3672 (2013.01); G06Q 20/3829 (2013.01); G06Q 2220/00 (2013.01)

(58) Field of Classification Search
CPC .................... G06Q 20/00–425; H04L 9/00–50
See application file for complete search history.

(56) References Cited

U.S. PATENT DOCUMENTS

| | | | |
|---|---|---|---|
| 7,611,065 B2 | 11/2009 | Behm | |
| 8,290,174 B1 | 10/2012 | Simon | |
| 11,282,139 B1 | 3/2022 | Winklevoss | |
| 11,295,318 B2 | 4/2022 | Andon | |
| 2015/0324789 A1 | 11/2015 | Dvorak | |
| 2016/0092988 A1 | 3/2016 | Letourneau | |
| 2016/0098730 A1* | 4/2016 | Feeney | G06Q 20/20 705/71 |
| 2018/0225638 A1 | 8/2018 | Ryann | |

(Continued)

OTHER PUBLICATIONS

"How to Sell NFT Tickets for an Event", Unlock Labs, https://unlock-protocol.com/guides/how-to-sell-nft-tickets-for-an-event/, May 3, 2022 (11 pages).

(Continued)

*Primary Examiner* — Ari Shahabi
(74) *Attorney, Agent, or Firm* — Esplin & Associates, PC

(57) ABSTRACT

Systems and methods to transfer a digital asset to a digital wallet from a temporary wallet are disclosed. Exemplary implementations may: establish a temporary wallet; effectuate a smart contract that causes the temporary wallet to hold a digital asset; generate a machine-readable medium that represent the temporary wallet; cause an output device to output the machine-readable medium on a physical article; upon a user device scanning the machine-readable medium, the user may be enabled to establish digital wallets or access digital wallets such that the digital asset is transferred from the temporary wallet to the digital wallet.

14 Claims, 5 Drawing Sheets

(56) References Cited

U.S. PATENT DOCUMENTS

| | | | |
|---|---|---|---|
| 2019/0180273 A1 | 6/2019 | Cummings | |
| 2020/0250752 A1* | 8/2020 | Sugarman | H04L 9/3239 |
| 2020/0273048 A1* | 8/2020 | Andon | G06Q 10/02 |
| 2021/0012325 A1 | 1/2021 | Harish | |
| 2021/0248594 A1 | 8/2021 | Yantis | |
| 2022/0188779 A1 | 6/2022 | Khaund | |
| 2022/0188839 A1 | 6/2022 | Andon | |
| 2023/0123865 A1 | 4/2023 | Quigley | |

OTHER PUBLICATIONS

"NFTs-New, Fairer Ticketing", SeatlabNFT Litepaper, https://assets.website-files.com/62543dc4e693bb934ed48f75/62963239e0a0fa583bade929_sea , Jun. 6, 2022 (23 pages).

Zhiyuan Sun, "Ticketmaster Selects Flow Blockchain for Minting NFT Event Tickets", https://cointelegraph.com/news/ticketmaster-selects-flow-blockchain-for-minting-nft-event-tickets , Aug. 3, 2022 (7 pages).

Ezra Reguerra; "From lunch to Solana: Here's the story of the NFT ATM in New York"; https://cointelegraph.com/news/from-lunch-to-solana-here-s-the-story-of-the-nft-atm-in-new-york; Mar. 2, 2022 (5 pages).

Cryptopedia; "How To Make a Paper Wallet; https://www.gemini.com/cryptopedia/paper-wallet-generator-cold-storage"; May 20, 2021 (6 pages).

Wilfred Chan, "What did I just buy?" https://www.theguardian.com/technology/2022/Feb/28/nft-vending-machine-new-york-blockchain; Feb. 28, 2022 (5 pages).

Abdul Ghaffar Khan, Amjad Hussain Zahid, Muzammil Hussain, Usama Riaz, "Security of Cryptocurrency Using Hardware Wallet and QR Code", Department of Software Engineering;University of Management and Technology, https://ieeexplore.ieee.org/ document/8966739 , 2019 (10 pages).

"Tictella—NFT Ticketing Platform", https://www.tictella.com/wp-content/uploads/2022/03/wp_en.pdf , Feb. 2, 2022 (19 pages).

* cited by examiner

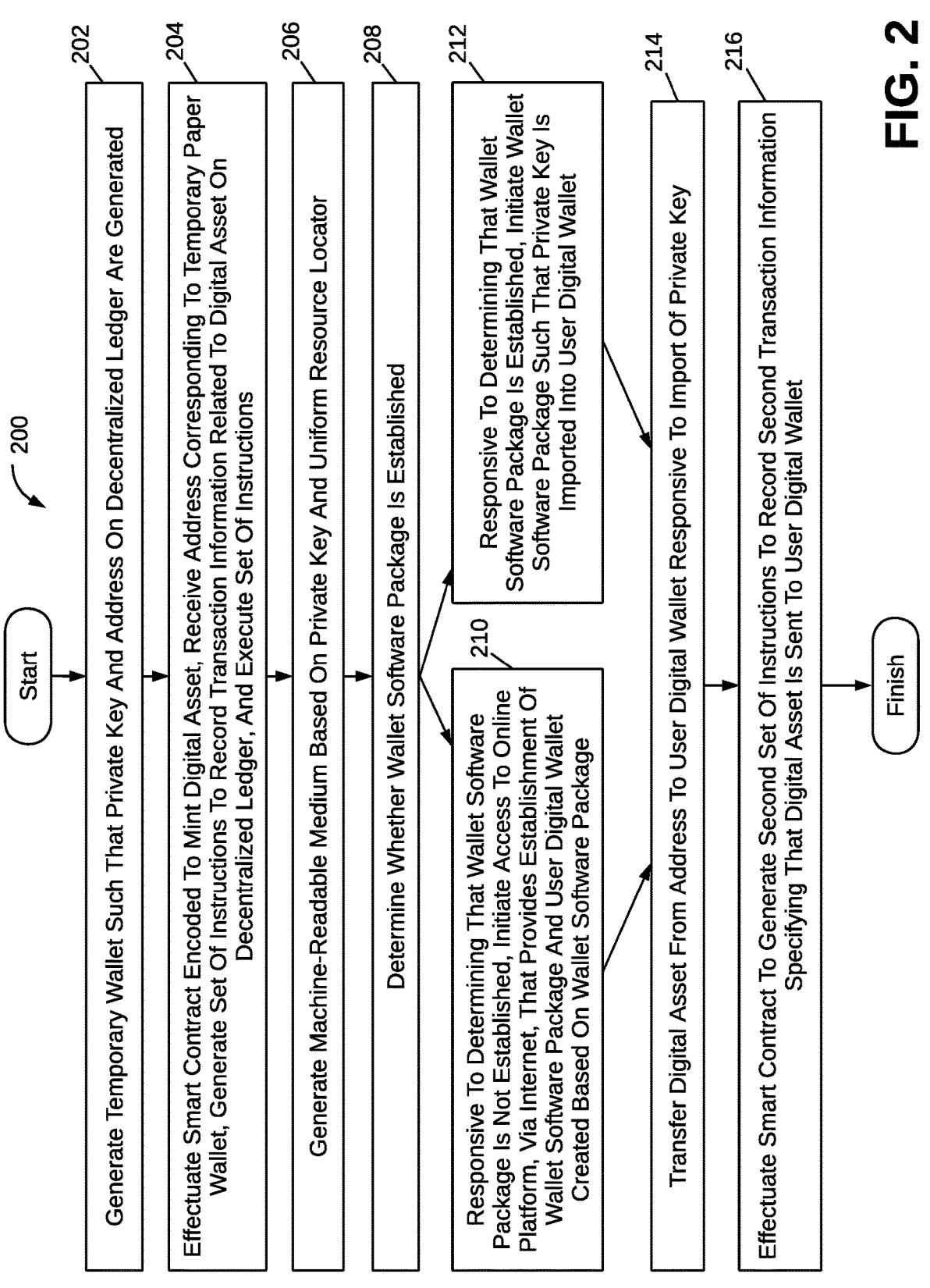

Start

202 — Generate Temporary Wallet Such That Private Key And Address On Decentralized Ledger Are Generated 204 — Effectuate Smart Contract Encoded To Mint Digital Asset, Receive Address Corresponding To Temporary Paper Wallet, Generate Set Of Instructions To Record Transaction Information Related To Digital Asset On Decentralized Ledger, And Execute Set Of Instructions 206 — Generate Machine-Readable Medium Based On Private Key And Uniform Resource Locator 208 — Determine Whether Wallet Software Package Is Established 210 — Responsive To Determining That Wallet Software Package Is Not Established, Initiate Access To Online Platform, Via Internet, That Provides Establishment Of Wallet Software Package And User Digital Wallet Created Based On Wallet Software Package 212 — Responsive To Determining That Wallet Software Package Is Established, Initiate Wallet Software Package Such That Private Key Is Imported Into User Digital Wallet 214 — Transfer Digital Asset From Address To User Digital Wallet Responsive To Import Of Private Key 216 — Effectuate Smart Contract To Generate Second Set Of Instructions To Record Second Transaction Information Specifying That Digital Asset Is Sent To User Digital Wallet Finish

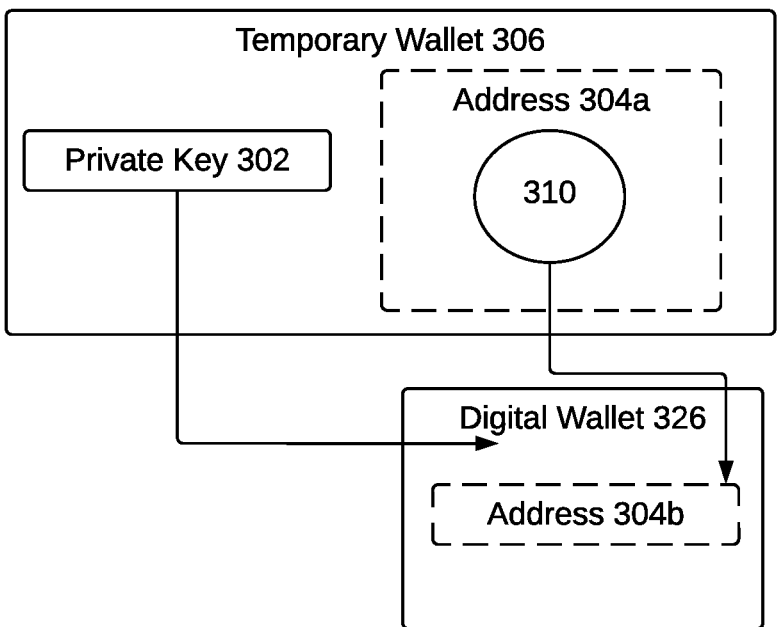
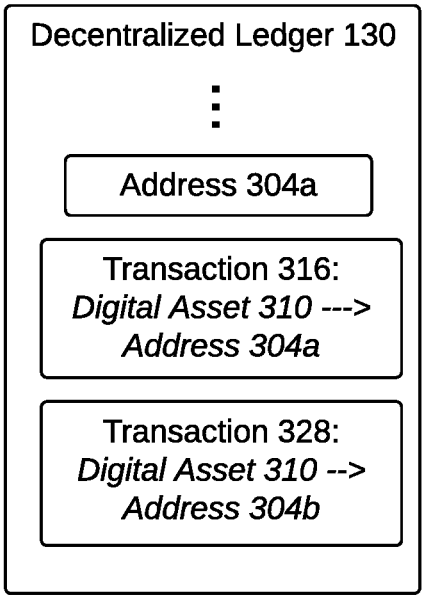
FIG. 3D

SYSTEMS AND METHODS TO GENERATE A DIGITAL ASSET ON A TEMPORARY WALLET AND TRANSFER THE DIGITAL ASSET TO A PERMANENT DIGITAL WALLET

CROSS-REFERENCE TO RELATED APPLICATIONS

The present application claims priority benefit of the U.S. Provisional Patent Application No. 63/388,563 titled "SYSTEMS AND METHODS TO GENERATE A DIGITAL ASSET ON A TEMPORARY WALLET AND TRANSFER THE DIGITAL ASSET TO A PERMANENT DIGITAL WALLET" filed on Jul. 12, 2022, the contents of which are incorporated herein by reference in their entirety. The subject matter of this related application is hereby incorporated herein by reference.

FIELD OF THE DISCLOSURE

The present disclosure relates to systems and methods to transfer a digital asset to a digital wallet from a temporary wallet.

BACKGROUND

Existing retail stores and/or attractions may provide physical articles and/or digital objects for purchase or obtainment. Such retail stores and/or attractions may not enable users who obtain the physical articles and/or digital objects to obtain digital assets that are associated with such, which may become collectible digital assets.

SUMMARY

One aspect of the present disclosure relates to a system configured to enable obtainment of digital assets at obtainment of a physical article or digital object. The system may establish a temporary wallet that includes an address recorded on a decentralized ledger and a private key that enables access to such address. A digital asset may be established and a transaction may be recorded on the decentralized ledger specifying that the address of the temporary wallet holds the digital asset. A physical article that may accompany the physical article or digital object at obtainment and may include a machine-readable medium that an owner of the physical article or digital object may scan with their personal smart device. The machine-readable medium may represent the temporary wallet. Additionally, scanning the machine-readable medium may enable the owner to either establish their own digital wallet or access an existing digital wallet. Subsequently, the digital asset held by the temporary wallet may be transferred to the owner's digital wallet. As such, a system that, in a decentralized manner, establishes a digital asset, distributes the digital asset to an individual that obtained the physical article or digital object, and records ownership of the digital asset by the individual, is provided. The system may enable and facilitate increased recordation of ownership of digital assets by providing individuals a simplified manner to do so. A decentralized manner of performing such limitations may ensure that a singular system does not burden performing all the limitations and risk overwhelming a set of servers, and that recordation of ownership of digital assets is immutable.

One aspect of the present disclosure relates to a system configured to transfer a digital asset to a digital wallet from a temporary wallet. The system may include one or more hardware processors configured by machine-readable instructions. The machine-readable instructions may include one or more instruction components. The instruction components may include one or more of temporary wallet generating component, contract effectuation component, medium generating component, wallet component, and/or other instruction components.

The temporary wallet generating component may be configured to generate a temporary wallet such that a private key and an address on a decentralized ledger are generated. The private key may provide access to consideration at an address.

The contract effectuation component may be configured to effectuate a smart contract. The smart contract may be encoded to i) mint a digital asset, ii) receive the address corresponding to the temporary wallet, iii) generate a set of instructions to record transaction information on the decentralized ledger that specifies the digital asset is to be sent to the address, iv) execute the set of instructions, and/or other functions.

The medium generating component may be configured to generate a machine-readable medium based on the private key and a uniform resource locator. The uniform resource locator may enable establishment of or provide access to a wallet software package upon a reader device interpreting the machine-readable medium.

The wallet component may be configured to determine whether the wallet software package is established. Responsive to determining that the wallet software package is not established, the wallet component may be configured to initiate access to an online platform via the Internet. The online platform may provide establishment of the wallet software package and a user digital wallet created based on the wallet software package. Responsive to determining that the wallet software package is established, the wallet component may be configured to initiate the wallet software package. As such, the private key may be imported into the user digital wallet. The wallet component may be configured to transfer the digital asset from the address to the user digital wallet responsive to the import of the private key. The wallet component may be configured to generate a second set of instructions. The second set of instructions may record second transaction information specifying that the digital asset is sent to the user digital wallet.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 2 illustrates a method to produce a physical article that provides admission authorization to an event and correlated digital asset from a temporary wallet, in accordance with one or more implementations.

FIG. 3D illustrates a transfer of the digital asset from the temporary wallet to the digital wallet of the owner of the toy and the physical article upon determination that the digital wallet is established, in accordance with one or more implementations.

DETAILED DESCRIPTION

Figure 1:
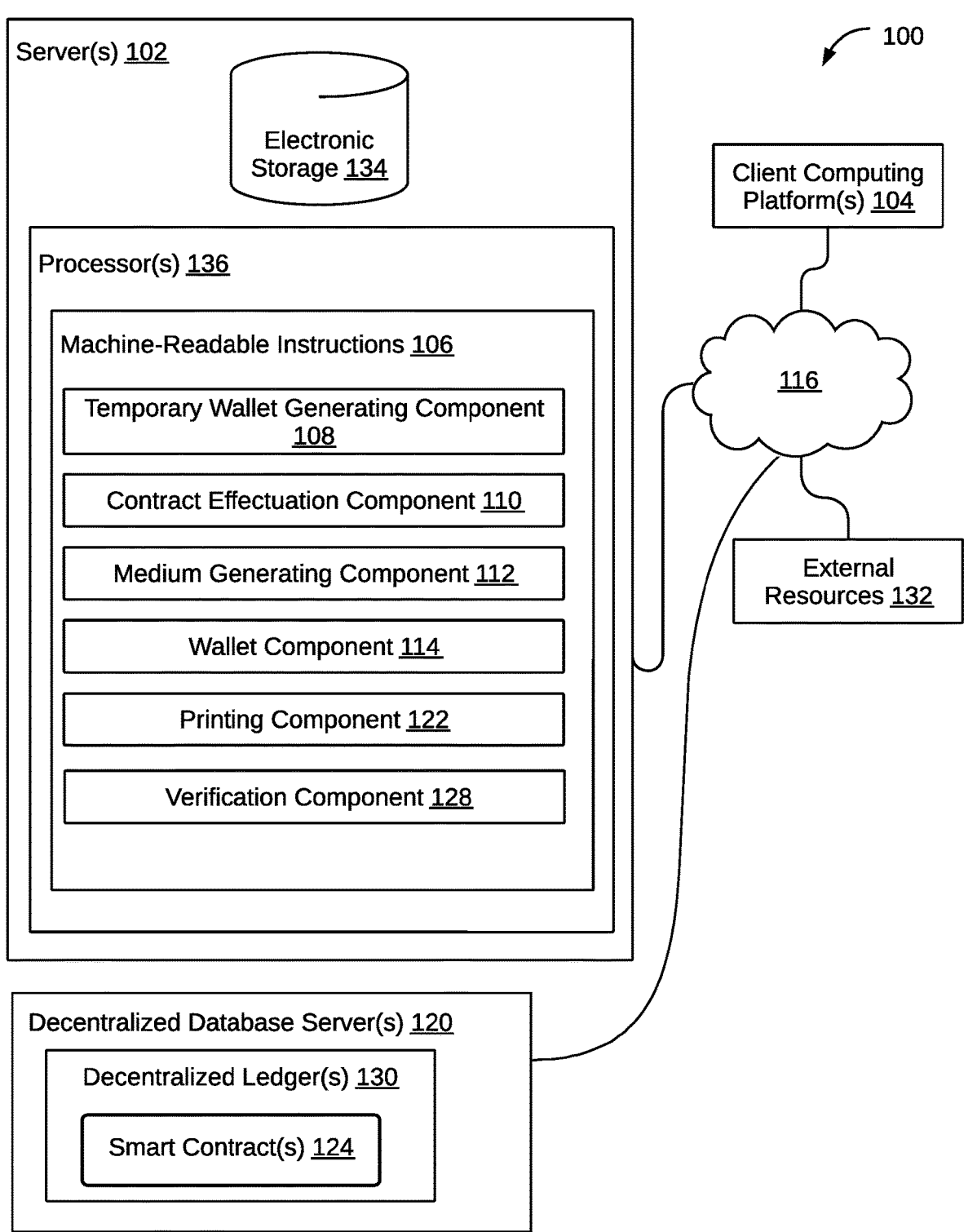
FIG. 1 illustrates a system configured to produce a physical article that provides admission authorization to an event and correlated digital asset from a temporary wallet, in accordance with one or more implementations.

FIG. 1 illustrates a system 100 configured to transfer a digital asset to a digital wallet from a temporary wallet, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

As used herein, the term "digital asset" may refer to a serial code tracked on one or more permanent registries. The digital assets may be uniquely identified and/or uniquely identifiable. As used herein, rights pertaining to digital assets may be tracked, recorded, and/or otherwise registered on one or more permanent registries. As such, an individual digital asset may be a registry-tracked digital asset.

Individual digital assets may be associated and/or correlated with another entity (which may be referred to as a "correlated entity") by virtue of technology provided and/or supported by the one or more permanent registries on which the rights pertaining to the individual digital assets are tracked (including but not limited to smart contracts and/or other executable code on the one or more permanent registries). Accordingly, rights pertaining to a digital asset may correlate to the provision of one or more rights (e.g., accessibility) with respect to the correlated entity (e.g., control and/or other accessibility). Transactions involving a digital asset recorded on a permanent registry may correlate to certain transactions (or modifications) of the correlated entity, and/or vice versa.

Various types and/or combinations of correlated entities are envisioned within the scope of this disclosure, including but not limited to physical article, digital objects, content, rights, memberships, grants, etc. The use of the singular "entity" or "correlated entity" is not intended to be limiting, as multiple different physical articles, digital objects, content, rights, memberships, grants, etc. may be correlated to a single digital asset. By way of non-limiting example, a correlated entity may be a physical article (e.g., artwork, a ticket to an event), a subscription to certain media content, content and so forth. The content may include an image, a video, a graphic image file, a signature of notoriety, a sound bite of an audio file, the audio file, and/or other content. In some implementations, the correlated entity may refer to any physical articles, digital objects, content, rights, memberships, grants, etc. related to art and entertainment for which a user may use, own, sell, trade, loan, destroy, and/or otherwise effectuate a change of ownership, access, or control (including exchanges through challenges).

A digital asset may be fungible if it is functionally and/or physically indistinguishable from another digital asset. A digital asset may be non-fungible if it is unique, or one-of-a-kind. For example, a specific individual may be non-fungible. A digital asset may be semi-fungible if there is a set of a limited number of similar but distinguishable digital assets. For example, a limited amount of images of a sports team for a particular year may be semi-fungible. For example, a digital ticket to a show, concert, exhibition, and/or other event may be semi-fungible. The semi-fungible digital assets are considered as unique, "not fungible", or non-fungible digital assets. In some implementations, the digital assets may include non-fungible tokens, fungible tokens, semi-fungible tokens, and/or other digital assets.

In some implementations, permanent registries, or decentralized ledger(s) 130, may be implemented by registry servers or decentralized database server(s) 120. The terms "permanent registries" and "decentralized ledgers" may be used interchangeably herein. The terms "registry servers" and "decentralized database servers" may be used interchangeably herein. In some implementations, one or more permanent registries may be decentralized and/or immutable registries. In some implementations, the one or more permanent registries may be one or more databases on which the rights pertaining to the individual digital assets are tracked and/or recorded. In some implementations, blockchains may be maintained by distributed computing platforms (not shown in FIG. 1). In some implementations, a distributed computing platform may be implemented by a set of client computing platforms and/or servers (including, for example, one or more registry servers). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of individual blockchains. For example, the smart contracts may be stored on one or more blockchains, and/or another permanent registry. In some implementations, the distributed computing platform may be Ethereum. In some implementations, the distributed computing platform may be similar to or based on Ethereum. In some implementations, the virtual machine may be a distributed and/or decentralized virtual machine.

In some implementations, at least one of the permanent registries may be a private permissioned permanent registry (e.g., a private permissioned blockchain). The private permissioned permanent registry may be configured to record information and/or track addresses (e.g., corresponding to digital wallets, smart contracts, etc.). The recorded information may include rights pertaining to the digital assets. For example, ownership rights and/or other accessibility may be modified. In some implementations, the ownership rights and/or other rights may be indicated by addresses, tracked and recorded by the permanent registries on the registry servers, that correspond to digital wallets of users and transaction information recorded on the permanent registry. In some implementations, a digital asset may be removed from one permanent registry and added or recorded on another permanent registry. In some implementations, at least one of the permanent registries implemented by the registry servers is a public permanent registry (e.g., a public blockchain). The public permanent registry may be configured to be part of either Ethereum mainnet, Ethereum 1.5, Ethereum 2.0, or a derivative of Ethereum 2.0 that is configured to perform transactions of Ether (ETH) between accounts.

Elements of a blockchain or another permanent registry may be grouped together in units that are referred to as blocks. For example, an individual block may include one or more digital assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital assets, one or more transactions, smart contracts, and/or other information.

In some implementations, one or more permanent registries implemented by the registry servers may be publicly accessible. In some implementations, for example, the one or more databases may be accessible via a mobile application or a website. In some implementations, one or more permanent registries implemented by the registry servers may be private and/or permissioned. In some implementations, one or more permanent registries implemented by the registry servers may be append-only. In some implementations, existing blocks of one or more permanent registries implemented by the registry servers can substantially not be altered or deleted, unless multiple copies are altered. This is unlikely to happen provided that the multiple copies are stored on different computing platforms, e.g., in different geographical locations. Permanent registries may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

Server(s) 102 may be configured by machine-readable instructions 106. Machine-readable instructions 106 may include one or more instruction components. The instruction components may include computer program components. The instruction components may include one or more of temporary wallet generating component 108, contract effectuation component 110, medium generating component 112, wallet component 114, printing component 122, verification component 128, and/or other instruction components.

Temporary wallet generating component 108 may be configured to generate a temporary wallet (e.g., a paper wallet). Generating a temporary wallet may include generation of a private key and an address on decentralized ledger(s) 130. The address may be generated based on a public key and a hash function. The public key may be generated based on the private key. The address may be shared to receive consideration. The private key authorizes control of any consideration associated with the public key and the address. The private key may authorize and initiate transactions of the consideration from the address. A secret phrase may be generated based on the private key and may provide access the consideration at the address. Using the secret phrase to access the consideration at the address includes converting the secret phrase to the private key that it was previously generated from. The secret phrase may be an ordered set of words that represent a human-readable and memorable form of the private key. The secret phrase may be 12, 18, 24, or other amount of words. The consideration may include one or more currencies, cryptocurrencies, digital assets, and/or other consideration.

Figure 3A:
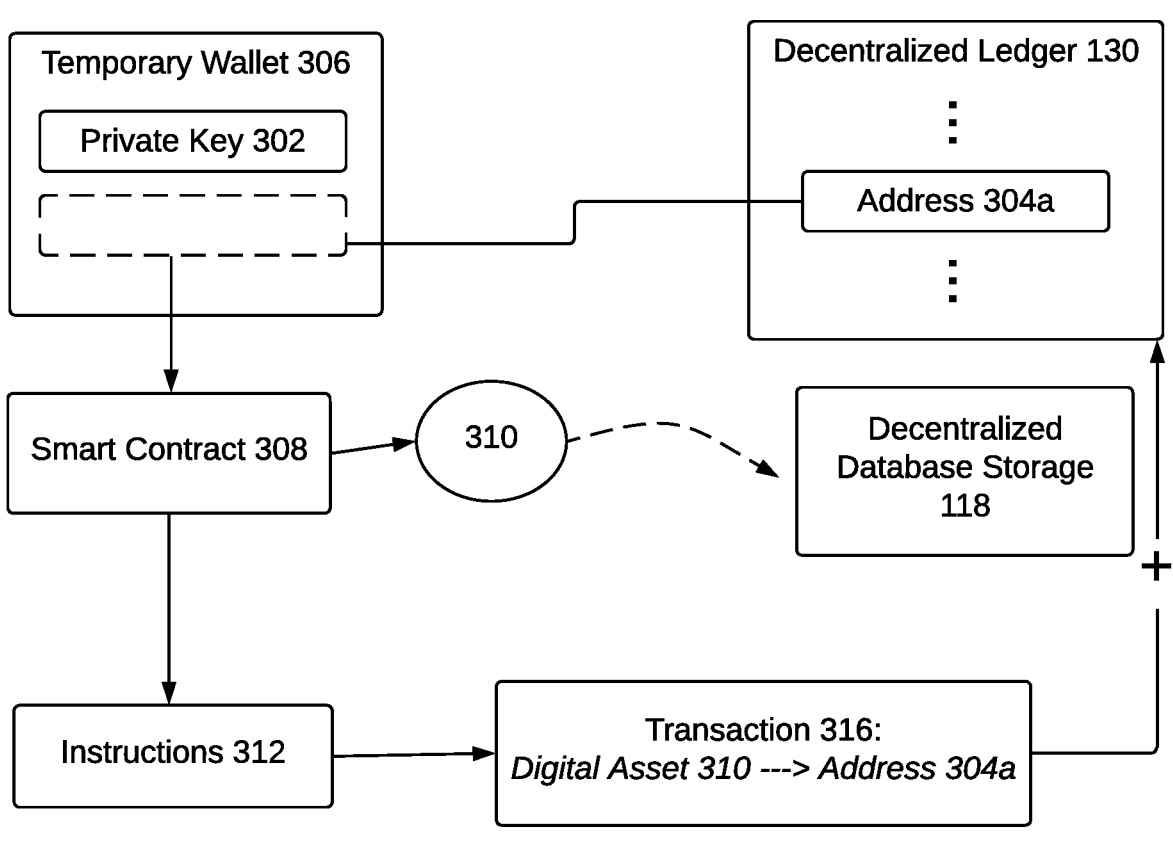
FIG. 3A illustrates an example implementation of the system configured to generate a temporary wallet, mint a digital asset, and establish that the temporary wallet holds the digital asset, in accordance with one or more implementations.

FIG. 3A-D may illustrate an example implementation of system 100 described in FIG. 1 throughout the Detailed Description. FIG. 3A illustrates a generated private key 302 and an address 304a to establish a temporary wallet 306. Address 304a may be recorded on decentralized ledger 130 (e.g., the same illustrated in FIG. 1).

Referring back to FIG. 1, contract effectuation component 110 may be configured to effectuate a smart contract 124. The smart contact may be encoded to mint a digital asset, receive the address corresponding to the temporary wallet, generate sets of instructions to record transaction information related to the digital asset on decentralized ledger(s) 130, execute the set of instructions, and/or other functions. Smart contract 124 may be configured to transmit the sets of instructions to the decentralized database server(s) 120 to execute. As such, a first set of instructions may be generated to record first transaction information specifying the digital asset is sent to the address. Thus, the temporary wallet, by way of the address, may hold the digital asset. Smart contract 124 may be configured to transmit the first set of instructions to the decentralized database server(s) 120 to execute. Thus, decentralized ledger(s) 130 may record that the temporary wallet holds the digital asset.

As used herein, the word "mint" may refer to performance, initiating, and/or execution of the process(es), transaction(s), procedure(s), operation(s), and/or step(s) that result in the instantiation of a given digital asset, including the establishment of ownership, and definition of appearance associated with the given digital asset. Minting the given digital asset may include generating the given digital asset record for a given composition entity. In some implementations, minting the given digital asset may include building an executable program. The executable program to be transmitted to a distributed computing platform(s) capable of executing the program. In some implementations, execution of the program by the distributed computing platform may display the entity correlated to the given digital asset on the distributed platforms. In some implementations, the given digital asset record may include values or other information that define the correlated entity. In some implementations, the given digital asset record may be recorded at a given address on decentralized ledger(s) 130 in a smart contract and/or other executable code. The given digital asset record may include information pertaining to the minted given digital asset, not limited to what defines the correlated entity.

Figure 3B:
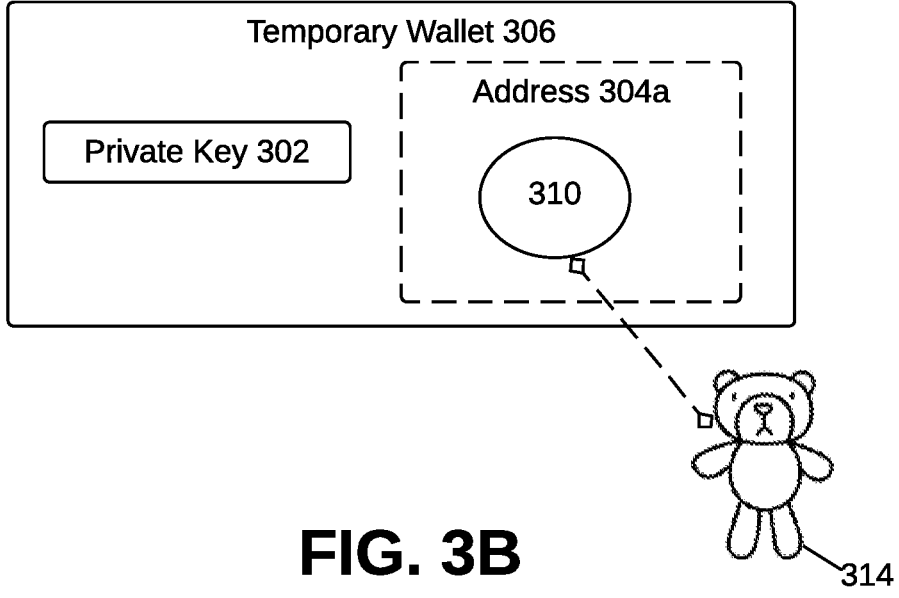
FIG. 3B illustrates the temporary wallet that is associated with an address, a private key that provides authorization to the digital asset at the address, and a toy correlated with the digital asset, in accordance with one or more implementations.

Referring back to FIG. 3A, a smart contract 308 (similar to or the same as smart contract 124 in FIG. 1) may mint digital asset 310. Furthermore, smart contract 308 may receive address 304*a* and generate instructions 312 to record a transaction 316 that specifies digital asset 310 is to be sent to address 304*a*. Transaction 316 may be recorded on decentralized ledger 130. Thus, FIG. 3B illustrates that temporary wallet 306 holds digital asset 310 by way of address 304*a* and private key 302 that enables authorization and initiation of transactions of the consideration, e.g., digital asset 310, from address 304*a*. Digital asset 310 may be correlated with a physical article 314 (e.g., a toy) sold in a retail store.

Referring to FIG. 1, medium generating component 112 may be configured to generate a machine-readable medium based on the private key, a uniform resource locator (URL), and/or other information. The machine-readable medium may be a machine-readable optical code (e.g., a quick response (QR) code, a barcode), a radio frequency identification (RFID) tag, a near field communication (NFC) chip, and/or other machine-readable medium. The URL may enable establishment of or provide access to a wallet software package upon a reader device interpreting the machine-readable medium. The reader device may be included in client computing platform 104 associated with a user. The reader device may include an RFID reader, a QR code scanner, a barcode scanner, an NFC chip reader, and/or other reader devices. Thus, upon the reader device interpreting the machine-readable medium, the URL may be executed.

By way of non-limiting example, the wallet software package may include a web software package, a desktop software package, a virtual computing software package, or a mobile software package. The wallet software package may be a locally run program that is installed on a computer (the desktop software package), installed on a mobile computing device (the mobile software package), or an extension installed on a web browser (the web software package). The program may run with connection to Internet and store private keys and public keys associated with digital wallets.

In some implementations, where the machine-readable medium is the machine-readable optical code, printing component 122 may be configured to instruct a printing device to print the machine-readable optical code on a physical article. By way of non-limiting example, the printing device may include an ink jet printer, a laser printer, a label printer, and/or other printing devices. By way of non-limiting example, the physical article may be a piece of paper, a toy, an article of clothing, a plastic card, a collectible article (e.g., a pin), and/or other physical article. In some implementations, the physical article may be associated with and/or be obtained in relation to a digital object. The digital object may include a virtual tool, virtual character, virtual pet, an online game, and/or other digital objects. Printing component 122 may be configured to instruct the printing device to obfuscate the machine-readable optical code. Obfuscating may include adding a silicone-based coating, a wax-based coating, a tamper-proof sticker, and/or other obfuscation over the machine-readable optical code. The obfuscation on the machine-readable optical code may be removed to expose the machine-readable optical code.

Figure 3C:
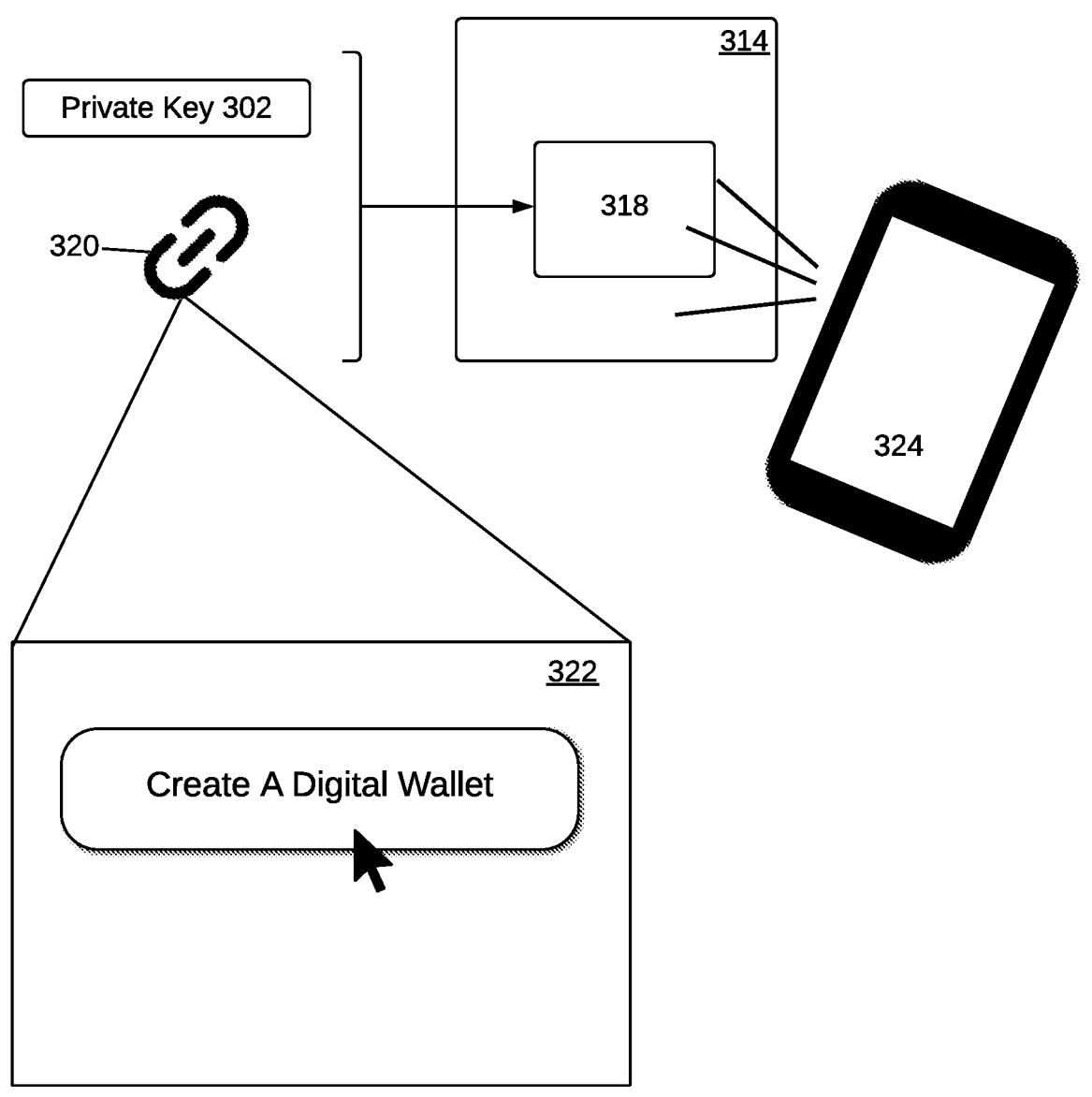
FIG. 3C illustrates a physical article that provides access to a wallet software package that enables establishment of a digital wallet for an owner of the toy, in accordance with one or more implementations.

FIG. 3C illustrates a portion of physical article 314 (the same illustrated in FIG. 3B) that includes a QR code 318 printed on physical article 314. QR code 318 may represent private key 302 (same as illustrated in FIG. 3B) and a URL 320. URL 320 may enable establishment of or provide access to a wallet software package upon a smart device 324, e.g., a handheld computer, a tablet computing platform, a Smartphone, a smart watch, an augmented-realty wearable, a virtual-reality wearable, scanning wallet QR code 318. QR code 318 may be obfuscated to safeguard private key 302 until the owner uncovers such.

Referring back to FIG. 1, in some implementations, verification component 128 may be configured to export a copy of the private key subsequent to generation of a paper version of the temporary wallet or non-paper version of the temporary wallet. The copy may be stored in electronic storage 134. Verification component 128 may be configured to verify that the machine-readable medium includes the private key. Verifying that the machine-readable medium correctly includes the private key may include receiving an interpretation of the machine-readable medium from a secondary reader. The secondary reader (not illustrated) may be included in system 100 and optically read the machine-readable medium. The secondary reader may be a code scanner, a digital code scanner, RFID reader, and/or other reader capable of reading machine-readable mediums. For example, the secondary reader may scan the machine-readable medium. Verification component 128 may be configured to determine whether the private key, which is the basis of the machine-readable medium, is output or otherwise recognized based on the received interpretation and the copy of the private key. Upon verification, verification component 128 may be configured to destroy the copy of the private key. Destroying the copy may include deleting the copy from electronic storage 134. Upon determination that the private key is not interpreted (e.g., not printed correctly, machine-readable medium does not output the private key), the machine-readable medium may be voided. Voiding the machine-readable medium may include physically destroying the physical article that the machine-readable medium is printed on, removing the machine-readable medium from the physical article, covering the machine-readable medium on the physical article, and/or other methods of voiding the machine-readable medium so that it is readable and unusable. In some implementations, the machine-readable medium may be re-generated based on the private key and re-verified. In some implementations, the machine-readable medium may be reprinted on the physical article. In some implementations, the verification the machine-readable medium correctly includes the private key may occur prior to printing the machine-readable medium on the physical article.

Wallet component 114 may be configured to determine whether the wallet software package is established. Responsive to determining that the wallet software package is not established, wallet component 114 may be configured to initiate access to an online platform via the Internet. The URL may initiate the online platform. The online platform may provide the wallet software package and establishment thereof. Subsequently, a user digital wallet for the user may be created based on the wallet software package. In some implementations, prior to access to the online platform and responsive to determining that the wallet software package is not established, wallet component 114 may be configured to effectuate presentation of a guide for establishing the wallet software package via the online platform and for establishing the user digital wallet via the wallet software package. The guide may be presented via client computing platform 104 associate with the user.

Referring to FIG. 3C, upon determining that the wallet software package is not established responsive to smart device 324 scanning wallet QR code 318, URL 320 may open a webpage 322 to enable the owner or user of smart device 324 to establish a digital wallet. Webpage 322 may be presented on smart device 324.

Referring back to FIG. 1, responsive to determining that the wallet software package is established, wallet component 114 may be configured to initiate the wallet software package. Initiating the wallet software package may include importing the private key into the user digital wallet, or the private key is determined based on receipt of the secret phrase and subsequently imported into the user digital wallet. Responsive to the import of the private key, wallet component 114 may be configured to transfer the digital asset from the address, and thus the temporary wallet, to the user digital wallet. The transfer may occur automatically upon the import of the private key.

In some implementations, wallet component 114 may be configured to generate a second set of instructions. The second set of instructions may record second transaction information specifying that the digital asset is sent to the user digital wallet. Wallet component 114 may be configured to transmit the second set of instructions to the decentralized database server(s) 120 to execute. Thus, decentralized ledger(s) 130 may record that the user digital wallet holds the digital asset.

Upon smart device 324 scanning QR code 318 and determining the wallet software package is already established and thus the owner owns a digital wallet, FIG. 3D illustrates temporary wallet 306 (same as illustrated in FIG. 3B) and private key 302 (same as illustrated in FIG. 3B) importing into a digital wallet 326 of the owner. Subsequently, given private key 302, digital asset 310 may be transferred from address 304a to an address 304b included in digital wallet 326. Thus, digital asset 310 may be held by the owner via their digital wallet 326 by way of address 304b and private key 302 that enables authorization and initiation of transactions of the consideration, e.g., digital asset 310, from address 304b. Additionally, instructions may be generated to record a transaction 328 that specifies digital asset 310 is sent to address 304b. Transaction 328 may be recorded on decentralized ledger 130 (the same illustrated in FIG. 1 and FIG. 3A).

Referring to FIG. 1, in some implementations, wallet component 114 may be configured to effectuate presentation of a notification that expresses confirmation that the digital asset was transferred from the temporary wallet to the user digital wallet. The notification may be presented via client computing platform 104 associated with the user.

In some implementations, server(s) 102, client computing platform(s) 104, and/or external resources 132 may be operatively linked via one or more electronic communication links. For example, such electronic communication links may be established, at least in part, via network 116 such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a smart watch, an augmented-realty wearable, a virtual-reality wearable, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s) 102 may include communication lines, or ports to enable the exchange of information with network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media and/or decentralized distributed storage that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 108, 110, 112, 114, 122, and/or 128, and/or other components. Processor(s) 136 may be configured to execute components 108, 110, 112, 114, 122, and/or 128, and/or other components by software; hardware; firmware; some combination of software, hardware, and/or firmware; and/or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 122, and/or 128 are illustrated in FIG. 1 as being implemented within a single processing unit, in implementations in which processor(s) 136 includes multiple processing units, one or more of components 108, 110, 112, 114, 122, and/or 128 may be implemented remotely from the other components. The description of the functionality provided by the different components 108, 110, 112, 114, 122, and/or 128 described below is for illustrative purposes, and is not intended to be limiting, as any of components 108, 110, 112, 114, 122, and/or 128 may provide more or less functionality than is described. For example, one or more of components 108, 110, 112, 114, 122, and/or 128 may be eliminated, and some or all of its functionality may be provided by other ones of components 108, 110, 112, 114, 122, and/or 128. As another example, processor(s) 136 may be configured to execute one or more additional components that may perform some or all of the functionality attributed below to one of components 108, 110, 112, 114, 122, and/or 128.

FIG. 2 illustrates a method 200 to transfer a digital asset to a digital wallet from a temporary wallet, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating a temporary wallet such that a private key and an address on a decentralized ledger are generated. The private key may provide access to consideration at the address. Operation 202 may be performed by one or more hardware processors configured by machine-readable instructions including a component that is the same as or similar to temporary wallet generating component 108, in accordance with one or more implementations.

An operation 204 may include effectuating a smart contract encoded to mint a digital asset, receiving the address corresponding to the temporary wallet, generating a set of instructions to record transaction information related to the digital asset on the decentralized ledger, and executing the set of instructions. Operation 204 may be performed by one or more hardware processors configured by machine-readable instructions including a component that is the same as or similar to contract effectuation component 110, in accordance with one or more implementations.

An operation 206 may include generating a machine-readable medium based on the private key and a uniform resource locator. The uniform resource locator may enable establishment of or provides access to a wallet software package upon a reader device interpreting the machine-readable medium. Operation 206 may be performed by one or more hardware processors configured by machine-readable instructions including a component that is the same as or similar to medium generating component 112, in accordance with one or more implementations.

An operation 208 may include determining whether the wallet software package is established. Operation 208 may be performed by one or more hardware processors configured by machine-readable instructions including a component that is the same as or similar to wallet component 114, in accordance with one or more implementations.

An operation 210 may include responsive to determining that the wallet software package is not established, initiating access to an online platform, via internet, that provides establishment of the wallet software package and a user digital wallet created based on the wallet software package. Operation 210 may be performed by one or more hardware processors configured by machine-readable instructions including a component that is the same as or similar to wallet component 114, in accordance with one or more implementations.

An operation 212 may include responsive to determining that the wallet software package is established, initiating the wallet software package such that the private key is imported into the user digital wallet. Operation 212 may be performed by one or more hardware processors configured by machine-readable instructions including a component that is the same as or similar to wallet component 114, in accordance with one or more implementations.

An operation 214 may include transferring the digital asset from the address to the user digital wallet responsive to the import of the private key of the temporary wallet. Operation 214 may be performed by one or more hardware processors configured by machine-readable instructions including a component that is the same as or similar to wallet component 114, in accordance with one or more implementations.

An operation 216 may include effectuating the smart contract to generate a second set of instructions to record second transaction information specifying that the digital asset is sent to the user digital wallet. Operation 216 may be performed by one or more hardware processors configured by machine-readable instructions including a component that is the same as or similar to wallet component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to transfer a digital asset to a user digital wallet from a temporary wallet, the system comprising:

a printing device; and one or more processors configured by machine-readable instructions to:

generate the temporary wallet such that a private key and an address on a decentralized ledger are generated, and wherein the private key provides access to consideration at the address;

effectuate a smart contract encoded to i) mint the digital asset, ii) receive the address corresponding to the temporary wallet, iii) generate a first set of instructions to record, on the decentralized ledger, first transaction information specifying the digital asset is sent to the address, and iv) execute the first set of instructions;

generate a machine-readable medium based on the private key and a uniform resource locator, wherein the uniform resource locator enables establishment of or provides access to a wallet software package upon a reader device interpreting the machine-readable medium, wherein the machine-readable medium is a machine-readable optical code;

determine whether the wallet software package is established;

responsive to determining that the wallet software package is not established, initiate access to a platform that provides establishment of the wallet software package and the user digital wallet created based on the wallet software package;

responsive to determining that the wallet software package is established, initiate the wallet software package such that the private key is imported into the user digital wallet;

transfer the digital asset from the address to the user digital wallet responsive to the import of the private key;

generate a second set of instructions to record, on the decentralized ledger, second transaction information specifying that the digital asset is sent to the user digital wallet;

instruct the printing device to print the machine-readable optical code on a physical article; and instruct the printing device to obfuscate the machine-readable optical code.

2. The system of claim 1, wherein the wallet software package includes a web software package, a desktop software package, a mobile software package, or virtual computing software package.

3. The system of claim 1, wherein the one or more processors are further configured by the machine-readable instructions to:

export a copy of the private key subsequent to generation of the temporary wallet;

verify that the machine-readable medium includes the private key; and upon verification, destroy the copy of the private key.

4. The system of claim 1, wherein the physical article is associated with and/or obtained in relation to a digital object.

5. The system of claim 1, wherein prior to access to the platform and responsive to determining that the wallet software package is not established, the one or more processors are further configured by the machine-readable instructions to:

effectuate presentation of a guide for establishing the wallet software package via the platform and the user digital wallet via the wallet software package.

6. The system of claim 5, wherein the reader device is a client computing platform associated with a user, and wherein the guide is presented via the client computing platform.

7. The system of claim 1, wherein generating the temporary wallet includes generating a secret phrase based on the private key, and wherein initiating the wallet software package responsive to determining that the wallet software package is established includes determining the private key based on the secret phrase and subsequently importing the private key into the user digital wallet.

8. A method to transfer a digital asset to a user digital wallet from a temporary wallet, the method comprising:

generating the temporary wallet such that a private key and an address on a decentralized ledger are generated, and wherein the private key provides access to consideration at the address;

effectuating a smart contract encoded to i) mint the digital asset, ii) receive the address corresponding to the temporary wallet, iii) generate a first set of instructions to record, on the decentralized ledger, first transaction information specifying the digital asset is sent to the address, and iv) execute the first set of instructions;

generating a machine-readable medium based on the private key and a uniform resource locator, wherein the uniform resource locator enables establishment of or provides access to a wallet software package upon a reader device interpreting the machine-readable medium, wherein the machine-readable medium is a machine-readable code;

determining whether the wallet software package is established;

responsive to determining that the wallet software package is not established, initiating access to a platform that provides establishment of the wallet software package and the user digital wallet created based on the wallet software package;

responsive to determining that the wallet software package is established, initiating the wallet software package such that the private key is imported into the user digital wallet;

transferring the digital asset from the address to the user digital wallet responsive to the import of the private key;

generating a second set of instructions to record, on the decentralized ledger, second transaction information specifying that the digital asset is sent to the user digital wallet;

providing instructions to a printing device;

printing, by the printing device and based on the instructions, the machine-readable optical code on a physical article; and obfuscating, by the printing device and based on the instructions, the machine-readable optical code printed on the physical article.

9. The method of claim 8, wherein the wallet software package includes a web software package, a desktop software package, a mobile software package, or a virtual computing software package.

10. The method of claim 8, further comprising:

exporting a copy of the private key subsequent to generation of the temporary wallet;

verifying that the machine-readable medium includes the private key; and upon verification, destroying the copy of the private key.

11. The method of claim 8, wherein the physical article is associated with and/or obtained in relation to a digital object.

12. The method of claim 8, wherein prior to access to the platform and responsive to determining that the wallet software package is not established, further comprising:

effectuating presentation of a guide for establishing the wallet software package via the platform and the user digital wallet via the wallet software package.

13. The method of claim 12, wherein the reader device is a client computing platform associated with a user, and wherein the guide is presented via the client computing platform.

14. The method of claim 8, wherein the generating of the temporary wallet includes generating a secret phrase based on the private key, and wherein the initiating of the wallet software package responsive to determining that the wallet software package is established includes determining the private key based on the secret phrase and subsequently importing the private key into the user digital wallet.

\* \* \* \* \*